United States Patent
Park et al.

(10) Patent No.: US 11,520,005 B2
(45) Date of Patent: Dec. 6, 2022

(54) PULSE RADAR APPARATUS AND OPERATING METHOD THEREOF

(71) Applicant: ELECTRONICS AND TELECOMMUNICATIONS RESEARCH INSTITUTE, Daejeon (KR)

(72) Inventors: Pil Jae Park, Daejeon (KR); Bon Tae Koo, Daejeon (KR); Seongdo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 17/159,366

(22) Filed: Jan. 27, 2021

(65) Prior Publication Data

US 2021/0239790 A1    Aug. 5, 2021

(30) Foreign Application Priority Data

Jan. 30, 2020    (KR) .................. 10-2020-0011169

(51) Int. Cl.
*G01S 7/292*    (2006.01)
*G01S 13/18*    (2006.01)

(52) U.S. Cl.
CPC ............ *G01S 7/2926* (2013.01); *G01S 13/18* (2013.01)

(58) Field of Classification Search
CPC ................................ G01S 13/18; G01S 7/2926
See application file for complete search history.

(56) References Cited

U.S. PATENT DOCUMENTS

| | | | |
|---|---|---|---|
| 5,805,110 | A | 9/1998 | McEwan |
| 7,551,703 | B2 | 6/2009 | McEwan |
| 9,581,688 | B2 | 2/2017 | Park et al. |
| 2009/0201195 | A1 | 8/2009 | Gazelle et al. |

(Continued)

FOREIGN PATENT DOCUMENTS

| KR | 10-1682652 B1 | 12/2016 |
|---|---|---|
| KR | 10-2018-0025131 A | 3/2018 |

OTHER PUBLICATIONS

Phan, A. T. et al., "Low-Power Sliding Correlation CMOS UWB Pulsed Radar Receiver for Motion Detection," 2009 IEEE International Symposium on Circuits and Systems, 2009, pp. 1541-1544.

*Primary Examiner* — Timothy X Pham
(74) *Attorney, Agent, or Firm* — Rabin & Berdo, P.C.

(57) ABSTRACT

Disclosed are a pulse radar apparatus that detects a position and a motion of a target, and an operating method thereof. The pulse radar apparatus includes a clock signal generator that outputs a transmission clock signal and a reception clock signal, a transmitter that generates a first signal, a receiver that receives an echo signal and the reception clock signal, and generates a second signal, and a signal processor that converts the second signal into a digital signal and analyzes the digital signal. The clock signal generator controls a transmission-to-reception clock delay, and generates a synchronization signal. The signal processor converts the digital signal into a representative value and analyzes the second signal using the representative value. The representative value is one of an accumulated sum of the digital signal in a time duration between synchronization signals and an average value of the digital signal in the time duration between synchronization signals.

16 Claims, 9 Drawing Sheets

(56) References Cited

U.S. PATENT DOCUMENTS

2012/0146852 A1    6/2012  Park et al.
2018/0059232 A1*  3/2018  Park .................... G01S 13/12
2018/0348355 A1  12/2018  Eo et al.
2020/0293078 A1*  9/2020  Seger, Jr. ............ H04L 25/0282

* cited by examiner

PULSE RADAR APPARATUS AND OPERATING METHOD THEREOF

CROSS-REFERENCE TO RELATED APPLICATIONS

This application claims priority under 35 U.S.C. § 119 to Korean Patent Application No. 10-2020-0011169 filed on Jan. 30, 2020, in the Korean Intellectual Property Office, the disclosures of which are incorporated by reference herein in their entireties.

BACKGROUND

Embodiments of the present disclosure described herein relate to a radar apparatus, and more particularly, relate to a pulse radar apparatus that uses a clock signal to improve a signal-to-noise ratio and an operating method thereof.

A radar may transmit and receive radio waves. The radar measures a time from the time the radio waves are transmitted to the time the reflected waves are received. Based on the measured time, the radar detects a direction and a position of an object that reflects the transmitted radio waves. The radio waves used in the radar may have a frequency of several MHz to several tens of GHz. A pulse radar and a continuous wave radar are typical types of radar.

The pulse radar repeatedly transmits a transmission pulse signal. The transmission pulse signal is reflected off a target and is returned as an echo signal. The pulse radar receives the echo signal and obtains information of the target. The information of the target includes the position of the target, the speed of the target, and motion information of the target. The motion information of the target is a unique feature of the target, and when a person is the target, the motion information is information such as gait, breathing, and heartbeat.

The pulse radar may be used to detect invisible areas. For example, when a building collapses and the debris of the collapse makes it difficult for rescuers to access, the pulse radar may be used to detect life-threatening victims at the scene of an accident, even if the rescuers are not directly put in. Therefore, the pulse radar should detect information of a target or a minute motion of the target in a distance. For reliable detection, the pulse radar needs to restore the echo signal with a high signal-to-noise ratio.

SUMMARY

Embodiments of the present disclosure provide a pulse radar apparatus with an improved signal-to-noise ratio and a method of operating the same.

Embodiments of the present disclosure provide a pulse radar apparatus that detects a position of a target using multiple transceivers and a method of operating the same.

According to an embodiment of the present disclosure, a pulse radar apparatus includes a clock signal generator, a transmitter, a receiver, and a signal processor. The clock signal generator outputs a transmission clock signal and a reception clock signal. The clock signal generator controls a transmission-to-reception clock delay between the transmission clock signal and the reception clock signal, and generates a synchronization signal representing a change in the transmission-to-reception clock delay. The transmitter generates a first signal, based on the transmission clock signal. The receiver receives an echo signal corresponding to the first signal, receives the reception clock signal, and generates a second signal, based on the echo signal and the reception clock signal. The signal processor converts the second signal into a digital signal and analyzes the digital signal. The signal processor converts the digital signal into a representative value using the synchronization signal and analyzes the second signal using the representative value. The representative value is one of an accumulated sum of the digital signal in a time duration between synchronization signals and an average value of the digital signal in the time duration between synchronization signals.

According to an embodiment, the clock signal generator may include a voltage controlled delay line, a phase detector, filter, a multiplexer, and control logic. The voltage controlled delay line may generate a plurality of clock signals, based on a reference clock signal applied from a reference clock signal generator. The phase detector may detect a phase of some clock signals output from the voltage controlled delay line. The filter may filter a signal output from the phase detector. The multiplexer may selectively output the transmission clock signal and the reception clock signal among the plurality of clock signals. The control logic may output a control command for selecting the transmission clock signal and the reception clock signal.

According to an embodiment, the voltage controlled delay line may be formed in multiple stages.

According to an embodiment, the synchronization signal may be generated when a clock signal pair having a specific transmission-to-reception clock delay value occurs at least two times or more.

According to an embodiment, the transmitter may include a transmission trigger signal generator, an oscillator, and a transmission antenna. The transmission trigger signal generator may generate and output a transmission trigger signal, based on the transmission clock signal. The oscillator may generate an oscillation signal, based on the transmission trigger signal. The transmission antenna may generate and radiate the first signal from the oscillation signal.

According to an embodiment, the receiver may include a reception antenna, an amplifier, and a sampler. The reception antenna may receive the echo signal and may generate a third signal, based on the echo signal. The amplifier may receive the third signal and may output an amplified signal by amplifying the third signal. The sampler may output a fourth signal generated by sampling the amplified signal, based on the reception clock signal.

According to an embodiment, the amplifier may include one of a low noise amplifier, a parametric amplifier, a field effect transistor amplifier, a tunnel diode amplifier, and a traveling wave tube amplifier.

According to an embodiment, the transmitter may include a plurality of the transmission trigger signal generators, a plurality of the oscillators, and a plurality of the transmission antennas. The receiver may include a plurality of the reception antennas, a plurality of the amplifiers, and a plurality of the samplers. The plurality of transmission antennas may radiate a plurality of the transmission signals. Each of the reception antennas may receive a plurality of the echo signals generated from the plurality of transmission signals.

According to an embodiment, the clock signal generator may be composed of a plurality of clock signal generators. The plurality of clock signal generators may output the transmission clock signals and the reception clock signals, respectively.

According to an embodiment, a range of the transmission-to-reception clock delay may be set in the clock signal generator. When the transmission-to-reception clock delay increases greater than or equal to the set range, the transmission-to-reception clock delay may be changed to a minimum value of the set range.

According to an embodiment, when the transmission-to-reception clock delay is changed to the minimum value of the set range, the pulse radar apparatus may output a minimum detection range notification signal.

According to an embodiment, the pulse radar apparatus may generate a radar scan signal by sequentially arranging the representative values generated by the signal processor for each time duration between synchronization signals, based on the minimum detection range notification signal. The pulse radar apparatus may compose a radar scan signal matrix by sequentially arranging the radar scan signal.

According to an embodiment, the signal processor may generate target detection distance information, based on the radar scan signal. The signal processor may generate a motion scan signal of the target, based on a difference between the radar scan signals. the signal processor may detect motion information of the target, when an absolute value of the motion scan signal is greater than or equal to a specific value.

According to an embodiment of the present disclosure, a method of operating a pulse radar apparatus includes generating a transmission clock signal and a reception clock signal, based on a reference clock signal that is received to a clock signal generator, generating a first signal, based on the transmission clock signal, and radiating the first signal through a transmission antenna, receiving an echo signal from a reception antenna, where the echo signal is reflected transmission signal off the target, generating a second signal, based on the echo signal, and converting the second signal into a digital signal, and analyzing the digital signal using a synchronization signal based on the transmission clock signal and the reception clock signal.

According to an embodiment, the generating and the radiating of the first signal may include generating a transmission trigger signal, based on the transmission clock signal, and converting the transmission trigger signal into an oscillation signal using an oscillator.

According to an embodiment, the generating of the second signal may include generating a third signal by amplifying a signal generated based on the echo signal, and sampling the third signal.

BRIEF DESCRIPTION OF THE FIGURES

The above and other objects and features of the present disclosure will become apparent by describing in detail some embodiments thereof with reference to the accompanying drawings.

DETAILED DESCRIPTION

Hereinafter, embodiments of the present disclosure will be described clearly and in detail such that those skilled in the art may easily carry out the present disclosure.

The terms used in the present specification are for describing some embodiments, and are not intended to limit the present disclosure. In the present specification, the singular form also includes the plural form unless otherwise specified in the phrase. As used herein, "comprises and/or comprising" does not exclude the presence or addition of one or more other components, steps, operations and/or elements to the mentioned components, steps, operations and/or elements.

Unless otherwise defined, all terms (including technical and scientific terms) used in the present specification may be used as meanings commonly understood by those skilled in the art to which the present disclosure pertains. In addition, terms defined in the commonly used dictionary are not interpreted ideally or excessively unless explicitly defined specifically. In the present specification, the same reference numerals may refer to the same components throughout the entire text.

Hereinafter, in the present specification, a transmission and reception operation of a radar using a pair of transmission clock signal and a reception clock signal is defined as a transmission and reception operation (a TRX Operation).

Figure 1:
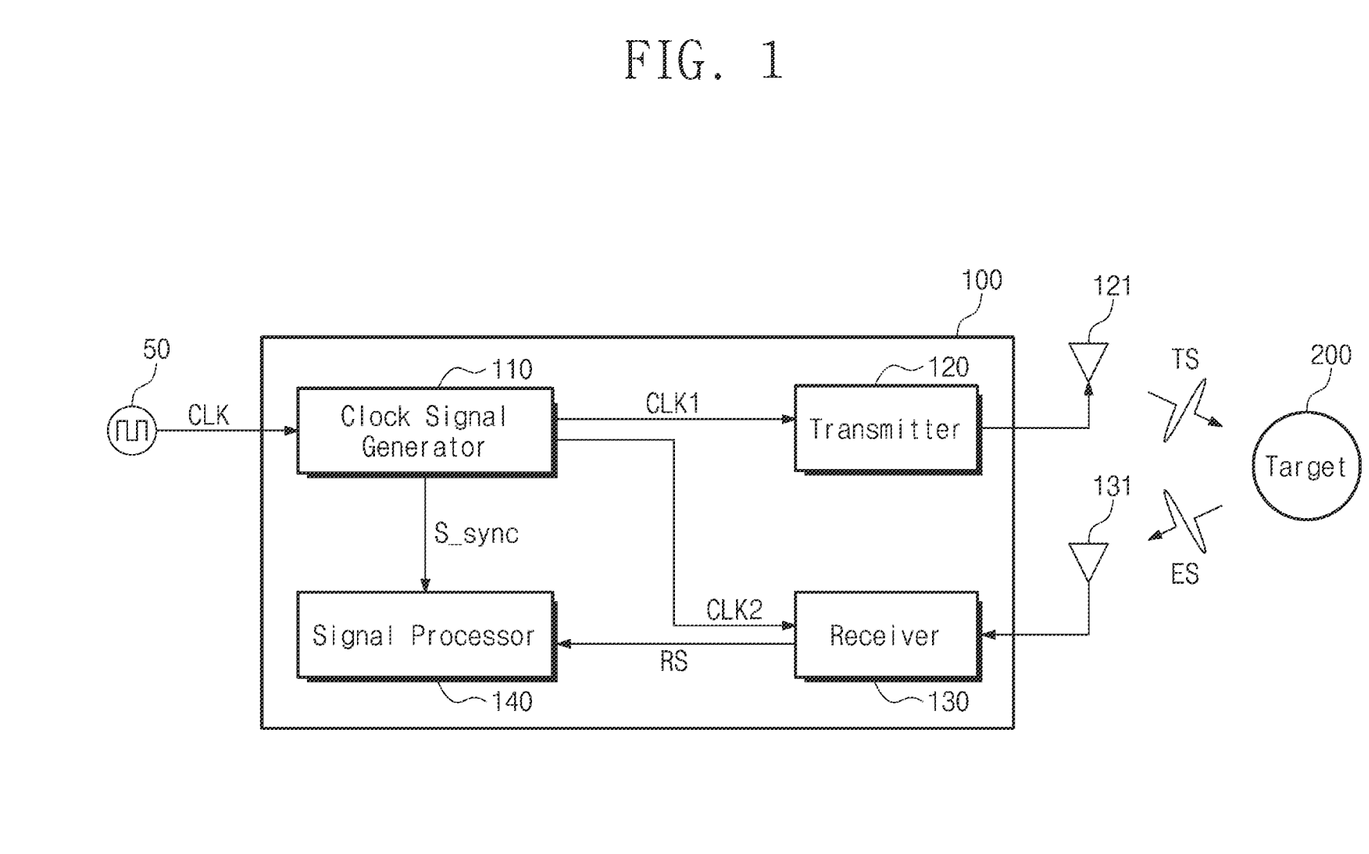
FIG. 1 is a block diagram illustrating a pulse radar apparatus according to an embodiment of the present disclosure.

FIG. 1 is a block diagram illustrating a pulse radar apparatus according to an embodiment of the present disclosure.

Referring to FIG. 1, a pulse radar apparatus 100 may include a clock signal generator 110, a transmitter 120, a receiver 130, and a signal processor 140. The transmitter 120 may include a transmission antenna 121. The receiver 130 may include a reception antenna 131.

The clock signal generator 110 may receive a reference clock signal CLK from a reference clock signal generator 50. The clock signal generator 110 may generate a transmission clock signal CLK1 used to generate a transmission signal TS in the transmitter 120, based on the reference clock signal CLK. The clock signal generator 110 may generate a reception clock signal CLK2 used to process an echo signal ES in the receiver 130, based on the reference clock signal CLK. The clock signal generator 110 may output the transmission clock signal CLK1 to the transmitter 120 and may output the reception clock signal CLK2 to the receiver 130.

Each of the transmission clock signal CLK1 and the reception clock signal CLK2 may periodically have a logic low value or a logic high value. The logic high value and logic low value of the transmission clock signal CLK1 and the reception clock signal CLK2 may respectively correspond to a magnitude of a specific voltage.

The clock signal generator 110 may output the reception clock signal CLK2 to the receiver 130 after a delay elapses from the time when the transmission clock signal CLK1 is output to the transmitter 120. This is referred to as a transmission-to-reception (Tx-to-Rx) clock delay. The transmission-to-reception clock delay may correspond to a detection distance of the pulse radar apparatus 100. For example, as the transmission-to-reception clock delay increases, so is the detection distance of the pulse radar apparatus 100. As the transmission-to-reception clock delay decreases, the detection distance of the pulse radar apparatus 100 may be shorter.

The transmitter 120 may receive the transmission clock signal CLK1 from the clock signal generator 110. The transmitter 120 may generate the transmission signal TS, based on the transmission clock signal CLK1. The transmission signal TS is a periodically generated oscillation signal having a specific oscillation width and center frequency. Accordingly, the transmission signal TS may have a period. The transmission antenna 121 may radiate the transmission signal TS to a target 200. The transmission signal TS may be reflected by the target 200.

The echo signal ES may be generated from the transmission signal TS reflected by the target 200. The echo signal ES may represent information related to the target 200. For example, the echo signal ES may indicate information related to a position and a speed of the target 200. The echo signal ES may be received from the target 200 to the receiver 130.

The receiver 130 may receive the reception clock signal CLK2 from the clock signal generator 110. The reception antenna 131 may receive the echo signal ES reflected from the target 200. The echo signal ES may include pulses having a specific width and a specific magnitude. The receiver 130 may generate a reception signal RS, based on the reception clock signal CLK2 applied from the clock signal generator 110 and the echo signal ES received from the reception antenna 131.

The signal processor 140 may include an analog to digital converter (ADC). The signal processor 140 may calculate values related to the target 200, based on the reception signal RS received from the receiver 130. For example, the signal processor 140 may calculate the position and the speed of the target 200, based on the reception signal RS. In addition, the signal processor 140 may receive a synchronization signal S_sync indicating a change in the transmission-to-reception clock delay between the transmission clock signal CLK1 and the reception clock signal CLK2 output from the clock signal generator 110. A signal processing method of the present disclosure will be described later in the detailed description of FIGS. 7 to 9.

Figure 2:
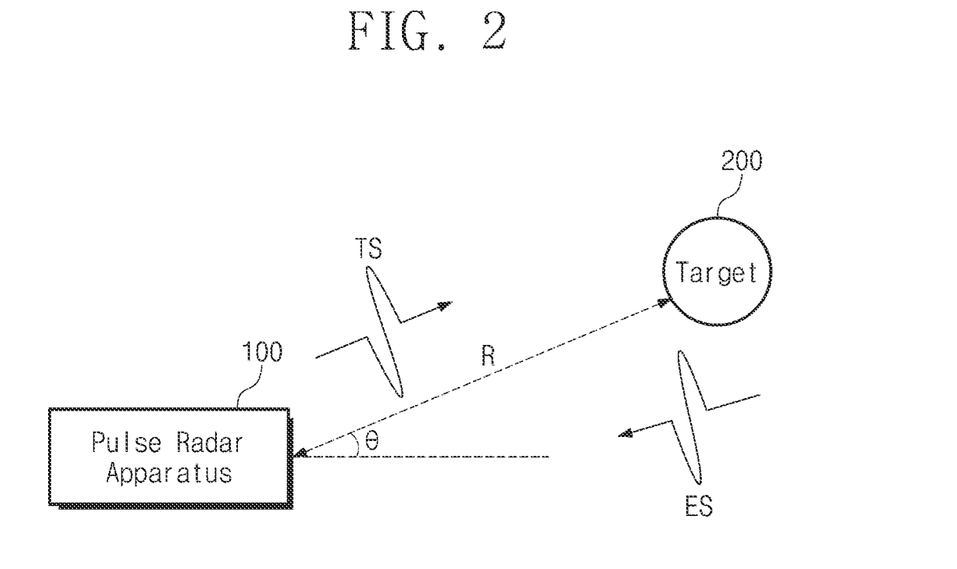
FIG. 2 is a diagram illustrating a schematic operation of a pulse radar apparatus according to an embodiment of the present disclosure.

FIG. 2 is a diagram illustrating a schematic operation of a pulse radar apparatus according to an embodiment of the present disclosure.

Referring to FIG. 2, the pulse radar apparatus 100 may radiate the transmission signal TS toward the target 200. For example, the transmission signal TS may include electromagnetic waves such as radio waves, infrared rays, visible rays, ultraviolet rays, X rays, and gamma rays. The pulse radar apparatus 100 may receive the echo signal ES returned after the transmission signal TS is reflected off the target 200. The pulse radar apparatus 100 may obtain information associated with the target 200 by analyzing the echo signal ES.

The information associated with the target 200 obtained by the pulse radar apparatus 100 may include a distance a' from the pulse radar apparatus 100 to the target 200 and an azimuth angle Θ between the pulse radar apparatus 100 and the target 200. The target 200 may include not only a fixed object but also a moving object. The pulse radar apparatus 100 may obtain position information and speed information of the target 200 from the distance a' and the azimuth angle Θ of the target 200.

Figure 3:
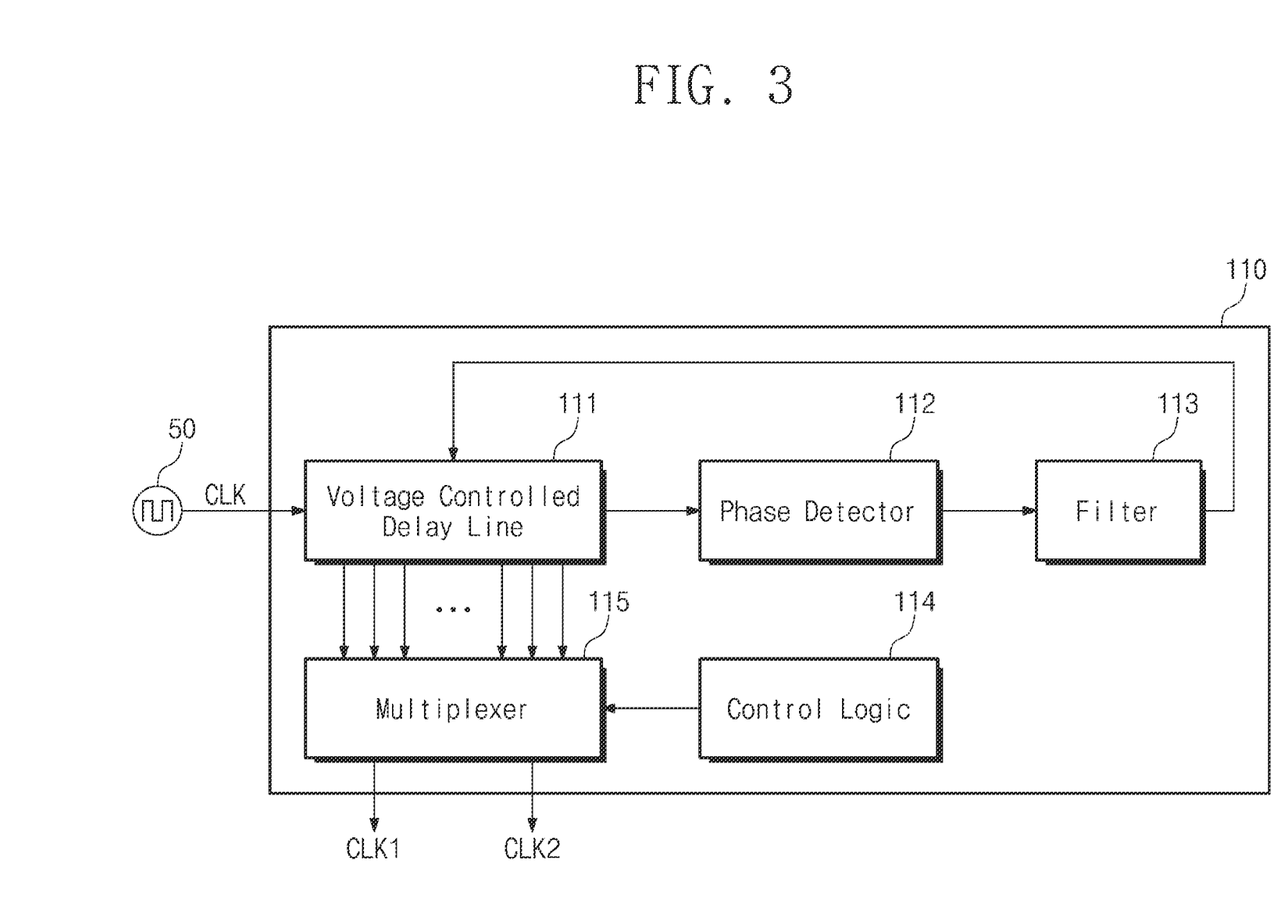
FIG. 3 is a block diagram illustrating a clock signal generator according to an embodiment of the present disclosure.

FIG. 3 is a block diagram illustrating a clock signal generator according to an embodiment of the present disclosure.

Referring to FIG. 3, the clock signal generator 110 may include a voltage controlled delay line (VCDL) 111, a phase detector (PD) 112, a filter 113, control logic 114, and a multiplexer 115. The clock signal generator 110 may receive the reference clock signal CLK from the reference clock signal generator 50 that may be located externally. The clock signal generator 110 may output the transmission clock signal CLK1 and the reception clock signal CLK2 that have transmission-to-reception clock delay values. The clock signal generator 110 may include a delay locked loop (DLL) in which a delay value is fixed from the reference clock signal CLK.

The delay locked loop DLL may include the voltage controlled delay line 111. The voltage controlled delay line 111 may be configured in multiple stages. The voltage controlled delay line 111 may generate clock signals having various delays using the reference clock signal CLK. For example, the voltage controlled delay line 111 may generate delayed clock signals from the equally divided reference clock signal CLK. The clock signals generated from the voltage controlled delay line 111 may output to the phase detector 112 and the multiplexer 115.

The phase detector 112 may detect a phase of a signal output from the voltage controlled delay line 111. The signal may output to the filter 113 through the phase detector 112. The signal that is filtered by the filter 113 may be returned to the voltage controlled delay line 111. In other words, through the voltage controlled delay line 111, the phase detector 112, and the filter 113, the signal may be fed back.

The multiplexer 115 may generate the transmission clock signal CLK1 and the reception clock signal CLK2 by selecting clock signals generated at each stage of the voltage controlled delay line 111 that consists of multi-stages. The transmission clock signal CLK1 and the reception clock signal CLK2 may be selected by a control of the control logic 114. The control logic 114 may set a time length $t_{avg}$ in which the same transmission-to-reception clock delay value is kept, a transmission-to-reception clock delay values that indicate a minimum detection distance and a maximum detection distance.

According to an embodiment of the present disclosure, when the transmission clock signal CLK1 and the reception clock signal CLK2 are generated, the clock signal generator 110 may generate multiples of clock signal pairs having a specific transmission-to-reception clock delay value. After the clock signal pair is generated multiple times, the transmission-to-reception clock delay value may increase or decrease by a specific time interval. When the transmission-to-reception clock delay value changes, the clock signal generator 110 may generate the synchronization signal S_sync (refer to FIG. 1). As another example, a procedure may be repeated, in which the transmission-to-reception clock delay value is reset to the minimum value when it reaches the maximum value by increasing the delay value by the specific time interval described above. When the transmission-to-reception clock delay value changes from the maximum value to the minimum value, a minimum detection range notification signal may be generated.

Figure 4:
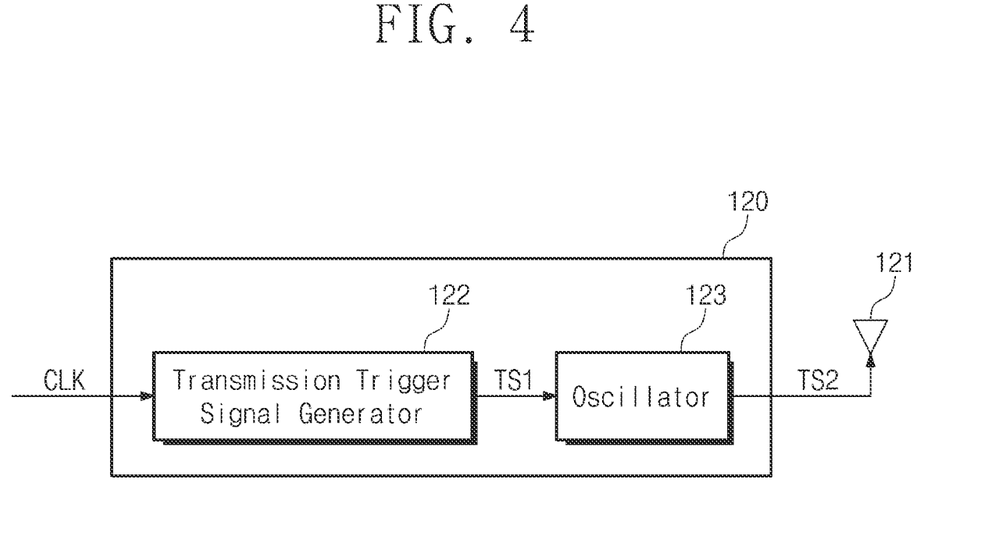
FIG. 4 is a block diagram illustrating a transmitter according to an embodiment of the present disclosure.

FIG. 4 is a block diagram illustrating a transmitter according to an embodiment of the present disclosure.

Referring to FIG. 4, the transmitter 120 may include a transmission trigger signal generator 122, an oscillator 123, and the transmission antenna 121. The transmitter 120 may receive the transmission clock signal CLK1 generated from the clock signal generator 110 (refer to FIG. 1).

The transmission trigger signal generator 122 may generate a transmission trigger signal TS1, based on the transmission clock signal CLK1. The transmission trigger signal generator 122 may generate the transmission trigger signal TS1 in response to a logic high value of the transmission clock signal CLK1. For example, the transmission trigger signal generator 122 may generate the transmission trigger signal TS1 in response to a rising edge of the section in which a logic value of the transmission clock signal CLK1 changes from a logic low value to a logic high value. The transmission trigger signal generator 122 may output the transmission trigger signal TS1 to the oscillator 123.

The oscillator 123 may receive the transmission trigger signal TS1 from the transmission trigger signal generator 122. The oscillator 123 may generate an oscillation signal TS2, based on the transmission trigger signal TS1. For example, the oscillator 123 may generate the oscillation signal TS2, based on a transmission trigger pulse included in the transmission trigger signal TS1. The oscillation signal TS2 may have a center frequency, and may be defined with a width and a magnitude. For example, the oscillation signal TS2 may include a sinusoidal wave having a center frequency. In addition, the oscillation signal TS2 may have a common mode voltage. The oscillator 123 may output the oscillation signal TS2 to the transmission antenna 121.

The transmission antenna 121 may receive the oscillation signal TS2 from the oscillator 123. The transmission antenna 121 may radiate the transmission signal TS (refer to FIG. 1) to the target, based on the oscillation signal TS2. The transmission signal TS may be an wireless signal. The characteristics of the transmission signal TS may be determined based on the transmission trigger signal TS1. For example, the transmission signal TS may be determined based on an amplitude or a width of the pulse of the transmission trigger signal TS1.

Figure 5:
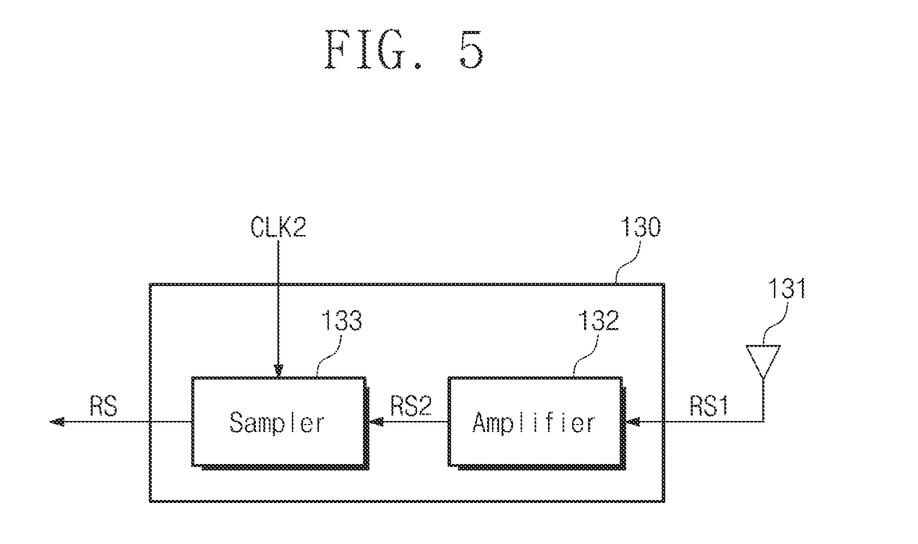
FIG. 5 is a block diagram illustrating a receiver according to an embodiment of the present disclosure.

FIG. 5 is a block diagram illustrating a receiver according to an embodiment of the present disclosure.

Referring to FIG. 5, the receiver 130 may include the reception antenna 131, an amplifier 132, and a sampler 133. The sampler 133 included in the receiver 130 may receive the reception clock signal CLK2 generated from the clock signal generator 110 (refer to FIG. 1).

The reception antenna 131 may receive the echo signal ES corresponding to the transmission signal TS (refer to FIG. 1). A width and a magnitude of the pulse included in the echo signal ES may be related to the width and the magnitude of the pulse included in the transmission signal TS, respectively. For example, as the magnitude of the pulse included in the transmission signal TS increases, the magnitude of the pulse included in the echo signal ES may increase. The reception antenna 131 may output a signal RS1 generated based on the echo signal ES to the amplifier 132 in response to the received echo signal ES. The characteristic of the signal RS1 generated based on the echo signal ES may be related to the characteristic of the echo signal ES.

The amplifier 132 may receive the signal RS1 generated based on the echo signal ES from the reception antenna 131.

The amplifier 132 may amplify the received signal RS1. For example, the amplifier 132 may be implemented as a low noise amplifier, a parametric amplifier, a field effect transistor amplifier, a tunnel diode amplifier, a low noise traveling wave tube amplifier, etc. The amplifier 132 may amplify the signal RS1 generated based on the echo signal ES to generate an amplified signal RS2, and may output the amplified signal RS2 to the sampler 133.

The sampler 133 may receive the amplified signal RS2 from the amplifier 132. Also, the sampler 133 may receive the reception clock signal CLK2 from the clock signal generator 110. The sampler 133 may sample the amplified signal RS2 received from the amplifier 132, based on the reception clock signal CLK2. For example, the sampler 133 may generate the reception signal RS in response to a rising edge of a section in which a logic value of the reception clock signal CLK2 changes from the logic low value to the logic high value. The reception signal RS may be a sampled signal. When the reception clock signal CLK2 is repeatedly applied, the sampler 133 may generate the reception signal RS in response to the rising edge of the repeatedly received reception clock signal CLK2.

Since the reception signal RS is generated based on the amplified signal RS2 and the amplified signal RS2 is generated based on the echo signal ES, the reception signal RS may be related to the echo signal ES. Accordingly, the reception signal RS may represent information related to the target 200 (refer to FIG. 1). The sampler 133 may output the reception signal RS to the signal processor 140.

Figure 6:
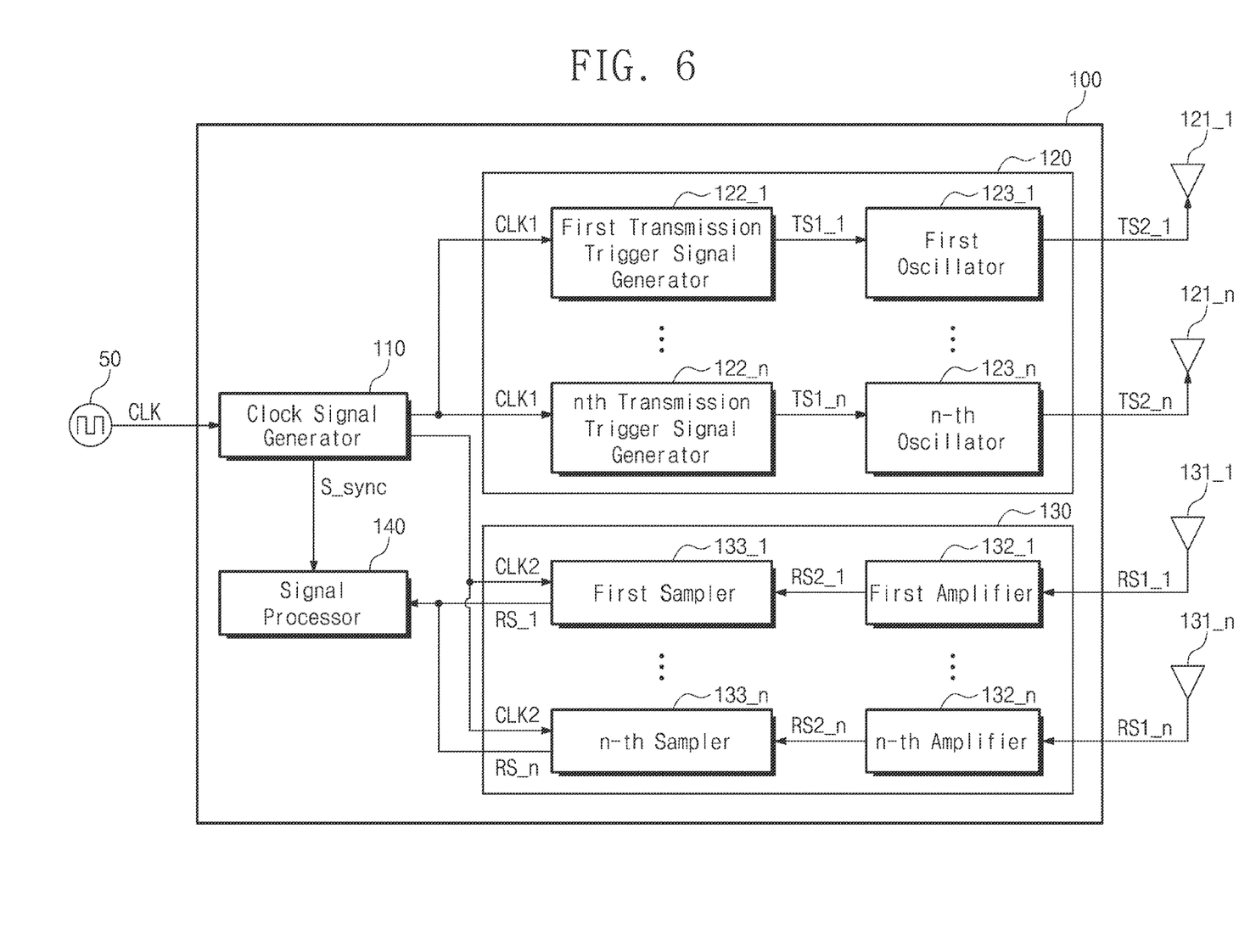
FIG. 6 is a block diagram illustrating a pulse radar apparatus according to an embodiment of the present disclosure.

FIG. 6 is a block diagram illustrating a pulse radar apparatus according to an embodiment of the present disclosure.

Referring to FIG. 6, the pulse radar apparatus 100 may include the clock signal generator 110, the transmitter 120, the receiver 130, and the signal processor 140. The transmitter 120 may include a first transmission trigger signal generator 122_1 to an n-th transmission trigger signal generator 122_n, a first oscillator 123_1 to an n-th oscillator 123_n, and a first transmission antenna 121_1 to an n-th transmission antenna 121_n. The receiver 130 may include a first reception antenna 131_1 to an n-th reception antenna 131_n, a first amplifier 132_1 to an n-th amplifier 132_n, and a first sampler 133_1 to an n-th sampler 133_n.

Each of the first transmission trigger signal generator 122_1 to the n-th transmission trigger signal generator 122_n may receive the transmission clock signal CLK1 output from the clock signal generator 110. Each of the first transmission trigger signal generator 122_1 to the n-th transmission trigger signal generator 122_n may output a first transmission trigger signal TS1_1 to an n-th transmission trigger signal TS1_n.

FIG. 6 illustrates an example in which the first transmission trigger signal generator 122_1 to the n-th transmission trigger signal generator 122_n receive the same transmission clock signal CLK1, but the first transmission trigger signal generator 122_1 to the n-th transmission trigger signal generator 122_n may receive two or more different transmission clock signals, respectively. As an example, each of the different transmission clock signals may have a different period.

The first oscillator 123_1 to the n-th oscillator 123_1 may receive the first transmission trigger signal TS1_1 to the n-th transmission trigger signal TS1_n, respectively. The first oscillator 123_1 to the n-th oscillator 123_1 may output the first oscillation signal TS2_1 to the n-th oscillation signal TS2_n, respectively. For example, the first oscillation signal TS2_1 to the n-th oscillation signal TS2_n may include pulses of different magnitudes, respectively.

The first transmission antenna 121_1 to the n-th transmission antenna 121_n may radiate 'n' transmission signals TS (refer to FIG. 1), based on the first oscillation signal TS2_1 to the n-th oscillation signal TS2_n. The 'n' transmission signals TS may be reflected by the target 200 (refer to FIG. 1) and may be returned as echo signals ES (refer to FIG. 1). The first to n-th reception antennas 131_1 to 131_n may receive 'n' echo signals ES. The first to n-th reception antennas 131_1 to 131_n may generate signals RS1_1 to RS1_n, respectively, based on the 'n' echo signals ES.

The first amplifier 132_1 to the n-th amplifier 132_n may respectively receive the signals RS1_1 to RS1_n. The signals RS1_1 to RS1_n may be amplified by the first amplifier 132_1 to the n-th amplifier 132_n to a first amplified signal RS2_1 to an n-th amplified signal RS2_n. The first amplified signal RS2_1 to the n-th amplified signal RS2_n may be output to the first sampler 133_1 to the n-th sampler 133_n.

Each of the first to n-th samplers 133_1 to 133_n may receive the reception clock signal CLK2 output from the clock signal generator 110. Each of the first to n-th samplers 133_1 to 133_n may sample the first amplified signal RS2_1 to the n-th amplified signal RS2_n, based on the reception clock signal CLK2. The sampled signals may be output in the form of a first reception signal RS_1 to an n-th reception signal RS_n.

FIG. 6 illustrates an example in which the first sampler 133_1 to the n-th sampler 133_n receive the same reception clock signal CLK2, but the first sampler 133_1 to the n-th sampler 133_n may respectively receive two or more different reception clock signals. As an example, each of the different reception clock signals may have a different period.

The signal processor 140 may receive the sampled first to n-th reception signals RS_1 to RS_n. In addition, the signal processor 140 may receive the synchronization signal S_sync that is generated by a change in the transmission-to-reception clock delay between the transmission clock signal CLK1 and the reception clock signal CLK2 generated by the clock signal generator 110. The signal processor 140 may calculate information related to the target 200, based on the reception signals RS_1 to RS_n received from the receiver 130 and the synchronization signal S_sync. For example, the signal processor 140 may calculate the position and the speed of the target 200, based on the reception signals RS_1 to RS_n. The signal processing method of the present disclosure will be described later in the detailed description of FIGS. 7 to 9.

Figure 7:
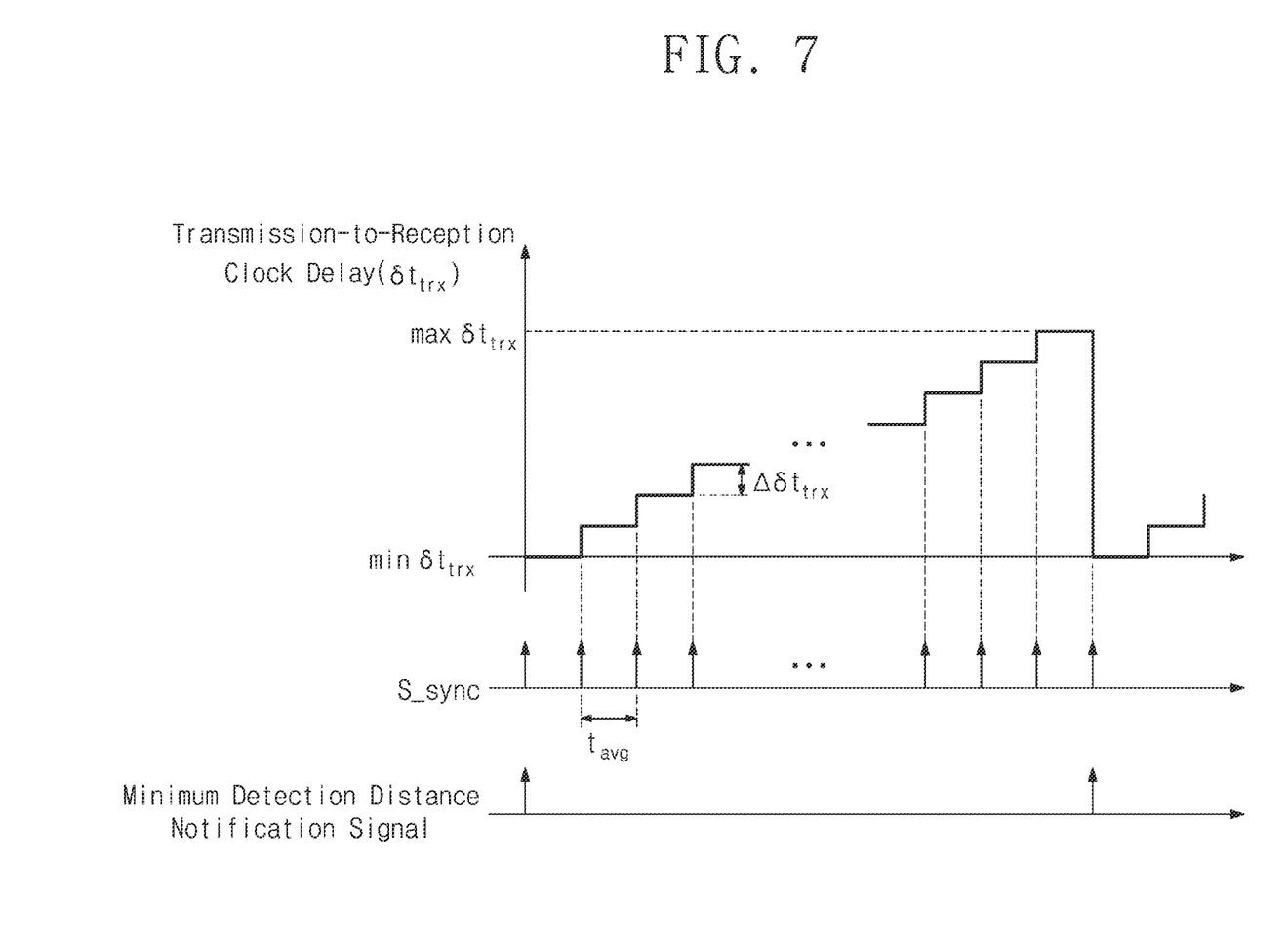
FIG. 7 is a diagram illustrating a transmission-to-reception clock delay value, and a synchronization signal and a minimum detection range notification signal according to the transmission-to-reception clock delay value, according to an embodiment of the present disclosure.

FIG. 7 is a diagram illustrating a transmission-to-reception clock delay value, a synchronization signal, and a minimum detection range notification signal, according to an embodiment of the present disclosure.

In more detail, FIG. 7 is a diagram illustrating clock signals that may be generated in a clock-based pulse radar apparatus according to an embodiment of the present disclosure. A pulse radar apparatus according to an embodiment of the present disclosure may radiate the transmission signal TS (refer to FIG. 1) generated based on the transmission clock signal CLK1 (refer to FIG. 1) to the target 200 (refer to FIG. 1), and may receive the echo signal ES (refer to FIG. 1) reflected from the target 200 by using the reception clock signal CLK2 (refer to FIG. 1) generated thereafter.

In one transmission/reception operation, the radar may detect a target distance corresponding to the transmission-to-reception clock delay value $\delta t_{trx}$ between the transmission clock signal CLK1 and the reception clock signal CLK2.

Accordingly, to detect an entire range, the transmission-to-reception clock delay value $\delta t_{trx}$ may be swept.

FIG. 7 illustrates the generation of a synchronization signal and a minimum detection range notification signal between a detection distance range corresponding to a minimum transmission-to-reception clock delay value (min $\delta t_{trx}$) and a maximum transmission-to-reception clock delay value (max $\delta t_{trx}$). For example, the pulse radar apparatus according to the present disclosure may perform a number of transmission/reception operations while maintaining the same transmission-to-reception clock delay value $\delta t_{trx}$.

During $t_{avg}$ of the same transmission-to-reception clock delay as illustrated in FIG. 7, multiple transmission/reception operations for the same target detection distance may be performed. By repeating a plurality of transmission/reception operations, the reception signal RS due to the echo signal ES may be further accumulated compared to noise. Accordingly, the signal-to-noise ratio (SNR) of the pulse radar apparatus 100 (refer to FIG. 1) may be improved.

Referring to FIG. 7, the synchronization signal S_sync may be generated when a change value $\Delta \delta t_{trx}$ of the transmission-to-reception clock delay value $\delta t_{trx}$ is detected. For example, when the transmission-to-reception clock delay value $\delta t_{trx}$ increases, the synchronization signal S_sync may be generated. The signal processor 140 (refer to FIG. 1) of the pulse radar apparatus 100 may convert the reception signal RS with respect to the same radar distance into the digital signal, based on the synchronization signal S_sync and analyze the converted reception signal RS.

In addition, the radar distance may be repeatedly detected while the transmission-to-reception clock delay value $\delta t_{trx}$ periodically changes. The detection distance of the pulse radar apparatus 100 may be proportional to the magnitude of the transmission-to-reception clock delay value $\delta t_{trx}$. When the transmission-to-reception clock delay value $\delta t_{trx}$ changes from the maximum transmission-to-reception clock delay value (max $\delta t_{trx}$) to the minimum transmission-to-reception clock delay value (min $\delta t_{trx}$), the minimum detection range notification signal may be generated.

Figure 8:
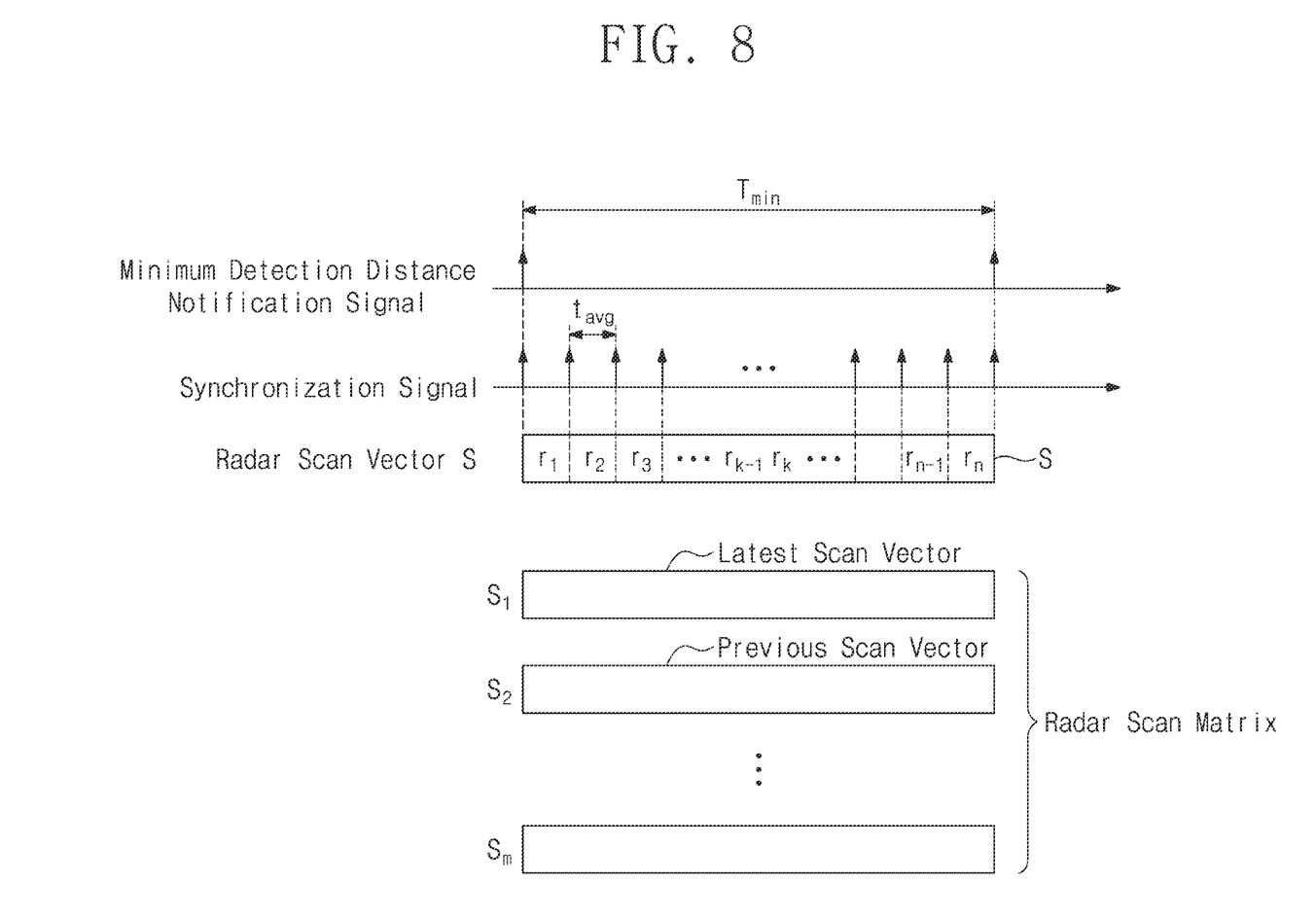
FIG. 8 is a diagram illustrating a minimum detection range notification signal, a synchronization signal, a radar scan signal, and a radar scan matrix according to an embodiment of the present disclosure.

FIG. 8 is a diagram illustrating a minimum detection range notification signal, a synchronization signal, a radar scan signal (radar scan vector), and a radar scan matrix according to an embodiment of the present disclosure.

As described above with reference to FIG. 7, the minimum detection range notification signal may be generated at a time when the transmission-to-reception clock delay value $\delta t_{trx}$ (refer to FIG. 7) decreases from the maximum value to the minimum value. In addition, the synchronization signal S_sync (refer to FIG. 1) may be generated at a time when the transmission-to-reception clock delay value $\delta t_{trx}$ changes.

According to an embodiment of the present disclosure, the reception signal RS (refer to FIG. 1) may be converted into the digital signal, based on the synchronization signal S_sync. The converted digital signal may be converted into one representative value. The converted representative value may be arranged as $r_1$ to $r_n$. For example, the representative value $r_1$ may be arranged immediately after the minimum detection range notification signal is generated. The representative value $r_n$ may be arranged immediately before the minimum detection range notification signal is generated.

The transmission-to-reception clock delay value $\delta t_{trx}$ may increase or decrease with a certain period. The period of the transmission-to-reception clock delay value $\delta t_{trx}$ may be the same as a period $T_{min}$ of the minimum detection range notification signal. Accordingly, the pulse radar apparatus 100 (refer to FIG. 1) may arrange representative values of $r_1$ to $r_n$ during the period $T_{min}$ of the minimum detection range notification signal. The arranged values of $r_1$ to $r_n$ may be defined as a radar scan signal S. Radar scan matrix data may be composed of repeatedly stored the radar scan signal S generated every period $T_{min}$ of the minimum detection range notification signal. Specifically, repetitively composed radar scan signals $S_1$, $S_2$ to $S_m$ may be defined as arrows or columns of radar scan matrix.

A motion scan signal may be generated through an operation between radar scan signals $S_1$, $S_2$ to $S_m$ included in the radar scan matrix. The motion scan signal is a scan signal generated by a moving object. In addition, previous scan signals $S_2$ to $S_n$ (n>2) that are computed with the received latest scan signal $S_1$ may be defined as a background noise signal.

The operation to generate the motion scan signal may include a method of obtaining a difference between the previous scan signals $S_2$ (or $S_n$, n>2) and the latest scan signal $S_1$; a method of obtaining an absolute value of a difference between the previous scan signals $S_2$ (or $S_n$, n>2) and the latest scan signal $S_1$; and a method of obtaining a difference between square of the latest scan signal $S_1$ and the square of the previous scan signals $S_2$. A method of obtaining a background noise vector may include a method of averaging a plurality of previous scan signals $S_2$ to $S_n$ and a method of weighting averaging a plurality of previous scan signals $S_2$ to $S_n$.

Figure 9:
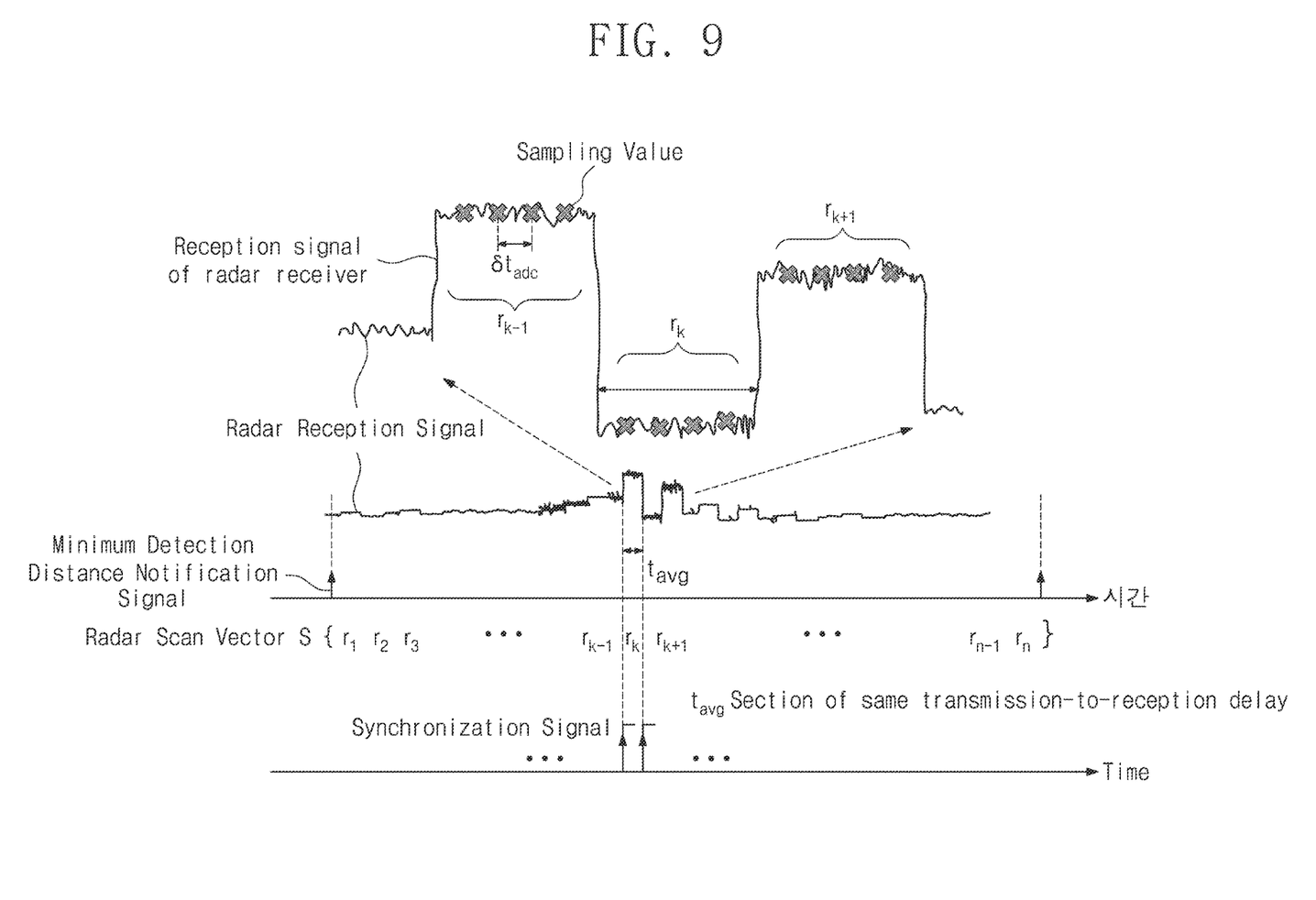
FIG. 9 is a diagram illustrating a sampling value of an echo signal, and a configuration of a radar scan signal, a minimum detection range notification signal, and a synchronization signal according to the sampled value, according to an embodiment of the present disclosure.

FIG. 9 is a diagram illustrating a sampling value of an echo signal, a configuration of a radar scan signal, a minimum detection range notification signal, and a synchronization signal according to the sampled value.

According to an embodiment of the present disclosure, the synchronization signal S_sync may occur when the transmission-to-reception clock delay value $\delta t_{trx}$ changes. The radar reception signal RS (refer to FIG. 1) between the synchronization signals S_sync means a signal detected for the same detection distance. Accordingly the radar reception signal may represent a pulse shape. The receiver 130 (refer to FIG. 1) of the pulse radar apparatus 100 (refer to FIG. 1) may repeatedly perform the reception (sampling) operations within the section $t_{avg}$ on which the same transmission-to-reception clock delay value is kept. The converted plurality of reception values may be converted into one representative value. The method of converting to the representative value may include a method of accumulating a plurality of received values and a method of averaging a plurality of received values.

Figure 10:
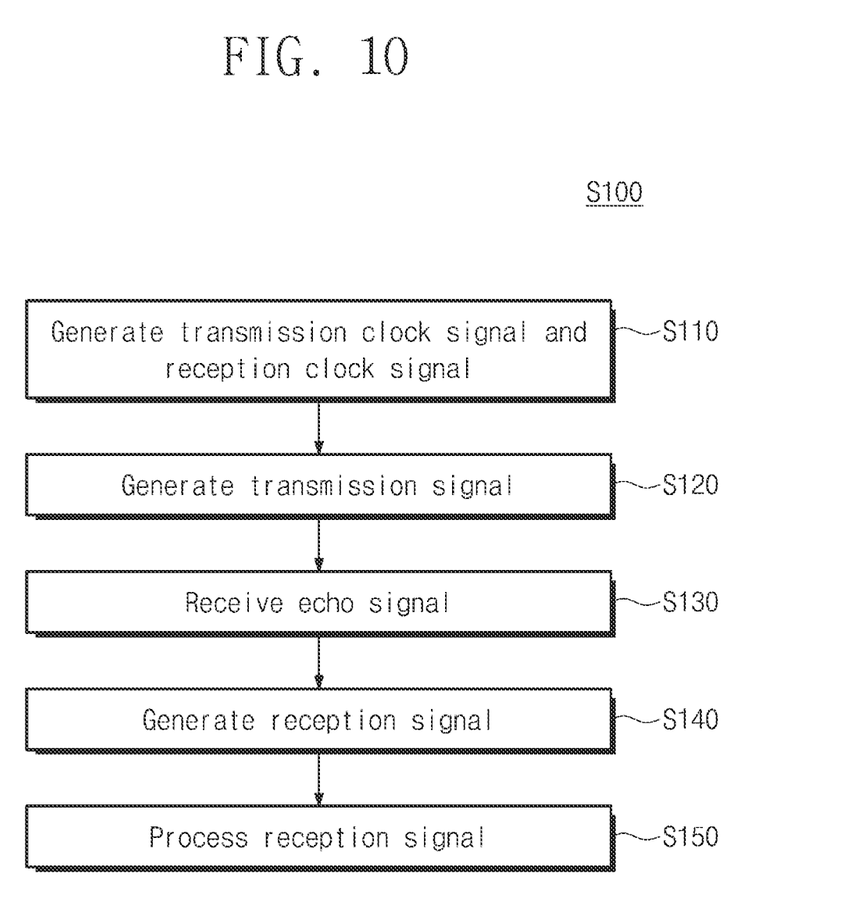
FIG. 10 is a flowchart illustrating a method of operating a pulse radar apparatus according to an embodiment of the present disclosure.

FIG. 10 is a flowchart illustrating a method of operating a pulse radar apparatus according to an embodiment of the present disclosure.

In operation S110, the clock signal generator 110 (refer to FIG. 1) included in the pulse radar apparatus 100 (refer to FIG. 1) may receive the reference clock signal CLK from the external reference clock generator 50 (refer to FIG. 1) and may generate the transmission clock signal CLK1 (refer to FIG. 1) and the reception clock signal CLK2 (refer to FIG. 1). The clock signal generator 110 may generate the synchronization signal S_sync (refer to FIG. 1), based on a change in the transmission-to-reception clock delay value of the transmission clock signal CLK1 and the reception clock signal CLK2.

In operation S120, the transmitter 120 (refer to FIG. 1) of the pulse radar apparatus 100 may receive the transmission clock signal CLK1 generated by the clock signal generator 110. The transmission trigger signal generator 122 (refer to FIG. 4) included in the clock signal generator 110 may generate the transmission trigger signal TS1 (refer to FIG. 4), based on the transmission clock signal CLK1. The oscillator 123 (refer to FIG. 4) included in the clock signal generator 110 may receive the transmission trigger signal TS1 to generate the oscillation signal TS2 (refer to FIG. 4). The transmission antenna 121 (refer to FIG. 1) may receive the oscillation signal TS2 and then may generate the transmission signal TS (refer to FIG. 1). The transmission antenna 121 may radiate the transmission signal TS toward the target 200 (refer to FIG. 1).

In operation S130, the reception antenna 131 (refer to FIG. 5) may receive the echo signal ES (refer to FIG. 1) reflected by the target 200 and returned. The reception antenna 131 may generate the signal RS1 transmitted to the amplifier 132 (refer to FIG. 5) included in the receiver 130 (refer to FIG. 1), based on the echo signal ES.

In operation S140, the amplifier 132 may amplify the signal RS1 output from the reception antenna 131 to generate the amplified signal RS2. The sampler 133 (refer to FIG. 5) included in the receiver 130 may receive the amplified signal RS2. Also, the sampler 133 may receive the reception clock signal CLK2 generated by the clock signal generator 110. The sampler 133 may generate the reception signal RS by sampling the amplified signal RS2, based on the reception clock signal CLK2.

In operation S150, the signal processor 140 (refer to FIG. 1) may receive the reception signal RS, may convert it into the digital signal, and may analyze the converted reception signal RS. The signal processor 140 may analyze the reception signal RS, based on the synchronization signal S_sync generated from the clock signal generator 110. In analyzing the reception signal RS, a change aspect of the transmission-to-reception clock delay value $\delta t_{trx}$ (refer to FIG. 7) may be used. The pulse radar apparatus 100 according to an embodiment of the present disclosure may improve the signal-to-noise ratio through repeated detection within a section $t_{avg}$ in which the transmission-to-reception clock delay value is the same.

According to an embodiment of the present disclosure, a pulse radar apparatus and an operating method thereof may improve a performance of the pulse radar apparatus by improving the signal-to-noise ratio.

According to an embodiment of the present disclosure, a pulse radar apparatus and an operating method thereof may measure the position and the azimuth angle of a target by using multiple transceivers.

The contents described above are specific embodiments for implementing the present disclosure. The present disclosure may include not only the embodiments described above but also embodiments in which a design is simply or easily capable of being changed. In addition, the present disclosure may also include technologies easily changed to be implemented using embodiments. Therefore, the scope of the present disclosure is not limited to the described embodiments but should be defined by the claims and their equivalents.

While the present disclosure has been described with reference to some embodiments thereof, it will be apparent to those of ordinary skill in the art that various changes and modifications may be made thereto without departing from the spirit and scope of the present disclosure as set forth in the following claims.

What is claimed is:

1. A pulse radar apparatus that detects a position and a motion of a target comprising:
   a clock signal generator configured to output a transmission clock signal and a reception clock signal;
   a transmitter configured to generate a first signal, based on the transmission clock signal;

a receiver configured to receive an echo signal corresponding to the first signal, to receive the reception clock signal, and to generate a second signal, based on the echo signal and the reception clock signal; and a signal processor configured to convert the second signal into a digital signal and to analyze the digital signal, wherein the clock signal generator controls a transmission-to-reception clock delay between the transmission clock signal and the reception clock signal, and generates a synchronization signal representing a change in the transmission-to-reception clock delay, wherein the signal processor converts the digital signal into a representative value using the synchronization signal, and analyzes the second signal using the representative value, and wherein the representative value is one of an accumulated sum of the digital signal in a time duration between synchronization signals and an average value of the digital signal in the time duration between synchronization signals.

2. The pulse radar apparatus of claim 1, wherein the clock signal generator includes:

a voltage controlled delay line configured to generate a plurality of clock signals, based on a reference clock signal applied from a reference clock signal generator;

a phase detector configured to detect a phase of some clock signals output from the voltage controlled delay line;

a filter configured to filter a signal output from the phase detector;

a multiplexer configured to selectively output the transmission clock signal and the reception clock signal among the plurality of clock signals; and control logic configured to output a control command for selecting the transmission clock signal and the reception clock signal.

3. The pulse radar apparatus of claim 2, wherein the voltage controlled delay line is formed in multiple stages.

4. The pulse radar apparatus of claim 1, wherein the synchronization signal is generated when a clock signal pair having a specific transmission-to-reception clock delay value occurs at least two times or more.

5. The pulse radar apparatus of claim 1, wherein the transmitter includes:

a transmission trigger signal generator configured to generate and output a transmission trigger signal, based on the transmission clock signal;

an oscillator configured to generate an oscillation signal, based on the transmission trigger signal; and a transmission antenna configured to generate and radiate the first signal from the oscillation signal.

6. The pulse radar apparatus of claim 5, wherein the receiver includes:

a reception antenna configured to receive the echo signal and to generate a third signal, based on the echo signal;

an amplifier configured to receive the third signal, and to output an amplified signal by amplifying the third signal; and a sampler configured to output a fourth signal generated by sampling the amplified signal, based on the reception clock signal.

7. The pulse radar apparatus of claim 6, wherein the amplifier includes one of a low noise amplifier, a parametric amplifier, a field effect transistor amplifier, a tunnel diode amplifier, and a traveling wave tube amplifier.

8. The pulse radar apparatus of claim 6, wherein the transmitter includes a plurality of the transmission trigger signal generators, a plurality of the oscillators, and a plurality of the transmission antennas, wherein the receiver includes a plurality of the reception antennas, a plurality of the amplifiers, and a plurality of the samplers, wherein the plurality of transmission antennas radiate a plurality of the transmission signals, and wherein each of the reception antennas receives a plurality of the echo signals generated from the plurality of transmission signals.

9. The pulse radar apparatus of claim 8, wherein the clock signal generator is composed of a plurality of clock signal generators, and wherein the plurality of clock signal generators output the transmission clock signals and the reception clock signals, respectively.

10. The pulse radar apparatus of claim 1, wherein the clock signal generator sets a range of the transmission-to-reception clock delay, and wherein, when the transmission-to-reception clock delay increases greater than or equal to the set range, the transmission-to-reception clock delay is changed to a minimum value of the set range.

11. The pulse radar apparatus of claim 10, wherein, when the transmission-to-reception clock delay is changed to the minimum value of the set range, the pulse radar apparatus outputs a minimum detection range notification signal.

12. The pulse radar apparatus of claim 11, wherein the pulse radar apparatus generates a radar scan signal by sequentially arranging the representative value generated by the signal processor for each time duration between synchronization signals, based on the minimum detection range notification signal, and wherein the pulse radar apparatus composes a radar scan signal matrix by sequentially arranging the radar scan signal.

13. The pulse radar apparatus of claim 12, wherein the signal processor is configured to:

generate target detection distance information, based on the radar scan signal, generate a motion scan signal of the target, based on a difference between the radar scan signals, and detect motion information of the target, when an absolute value of the motion scan signal is greater than or equal to a specific value.

14. A method of operating a pulse radar apparatus that detects a position and a motion of a target, the method comprising:

generating a transmission clock signal and a reception clock signal, based on a reference clock signal that is received to a clock signal generator;

generating a first signal, based on the transmission clock signal, and radiating the first signal through a transmission antenna;

receiving an echo signal from a reception antenna, where the echo signal is reflected transmission signal off the target;

generating a second signal, based on the echo signal; and converting the second signal into a digital signal, and analyzing the digital signal using a synchronization signal based on the transmission clock signal and the reception clock signal.

15. The method of claim 14, wherein the generating and the radiating of the first signal include:

generating a transmission trigger signal, based on the transmission clock signal; and converting the transmission trigger signal into an oscillation signal using an oscillator.

16. The method of claim 14, wherein the generating of the second signal includes:
   generating a third signal by amplifying a signal generated based on the echo signal; and
   sampling the third signal.

\* \* \* \* \*